(12) United States Patent
Huang

(10) Patent No.: US 9,229,301 B2
(45) Date of Patent: Jan. 5, 2016

(54) ILLUMINATION SYSTEM AND PROJECTION DEVICE COMPRISING THE SAME

(71) Applicant: DELTA ELECTRONICS, INC., Kuei San, Taoyuan Hsien (TW)

(72) Inventor: June-Jei Huang, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 75 days.

(21) Appl. No.: 14/273,710

(22) Filed: May 9, 2014

(65) Prior Publication Data

US 2015/0177599 A1 Jun. 25, 2015

(30) Foreign Application Priority Data

Dec. 24, 2013 (TW) .............................. 102147876 A

(51) Int. Cl.
| | |
|---|---|
| G03B 21/00 | (2006.01) |
| G03B 21/14 | (2006.01) |
| F21K 99/00 | (2010.01) |
| G03B 21/20 | (2006.01) |
| F21Y 101/02 | (2006.01) |

(52) U.S. Cl.
CPC ............... *G03B 21/142* (2013.01); *F21K 9/56* (2013.01); *G03B 21/204* (2013.01); *G03B 21/2013* (2013.01); *F21Y 2101/02* (2013.01)

(58) Field of Classification Search
CPC .. G03B 21/20; G03B 21/2013; G03B 21/204; F21K 9/56; F21V 9/16
USPC ................... 353/31, 34, 33, 37, 94; 349/5–9; 362/230, 231; 359/629, 634, 638
See application file for complete search history.

(56) References Cited

U.S. PATENT DOCUMENTS

| | | | | |
|---|---|---|---|---|
| 8,911,092 B2* | 12/2014 | Fujita | ................... | G03B 21/204 353/31 |
| 2014/0253881 A1* | 9/2014 | Osaka | ................ | G03B 21/2013 353/20 |
| 2014/0254129 A1* | 9/2014 | Miyoshi | .................. | F21V 13/08 362/84 |
| 2014/0285774 A1* | 9/2014 | Tajiri | ..................... | G03B 21/28 353/38 |
| 2015/0233550 A1* | 8/2015 | Wu | ......................... | F21V 14/08 353/84 |

\* cited by examiner

*Primary Examiner* — William C Dowling
(74) *Attorney, Agent, or Firm* — Muncy, Geissler, Olds & Lowe, P.C.

(57) ABSTRACT

An illumination system includes a light source module, a light splitting module, a light consolidating module and a waveband converting module. The light source module has a first light source, which provides a first light beam of first waveband. The light splitting module has a first light splitting element and a second light splitting element. The first light splitting element allows the light beam of first waveband to pass through and reflects the light beam of second waveband. The second light splitting element allows the light beam of second waveband to pass through and reflects the light beam of first waveband. The light consolidating module reflects the light beam having an incident angle greater than a predetermined angel and allows the light beam having an incident angle smaller than the predetermined angel to pass through. The waveband converting module has a first waveband converting zone.

20 Claims, 12 Drawing Sheets

ILLUMINATION SYSTEM AND PROJECTION DEVICE COMPRISING THE SAME

CROSS REFERENCE TO RELATED APPLICATIONS

This Non-provisional application claims priority under 35 U.S.C. §119(a) on Patent Application No(s). 102147876 filed in Taiwan, Republic of China on Dec. 24, 2013, the entire contents of which are hereby incorporated by reference.

BACKGROUND OF THE INVENTION

1. Field of Invention

The present invention relates to an illumination system and, in particular, to an illumination system applied to a projection device.

2. Related Art

Recently, the small and compact projection device has become one of the popular products and is the trend of the development in the projector technology. The projection device can be roughly cut into an illumination system and an imaging system. Most manufacturers have their unique designs in the illumination system and imaging system so as to minimize the size of the illumination or imaging system, enhance the performance of the projection device, and provide high-quality images.

The conventional illumination system at least includes a red LED, a green LED and a blue LED, and converge lenses are configured adjacent to the LEDs for providing the light consolidating function. To be noted, the illumination system needs the converge lenses disposed adjacent to the LEDs to converge light beams for the following light consolidating procedure. Thus, many optical components are necessary, and unfortunately, the weight of the illumination system is consequentially increased. Therefore, this design of illumination system, which usually has larger size, is not suitable for the minimization of the projectors.

Therefore, it is desired to effectively configure the optical elements inside the illumination system so as to provide a novel design with simpler structure and better color gamut and saturation, which can still effectively reduce the size and weight of the illumination system.

SUMMARY OF THE INVENTION

In view of the foregoing, an objective of the present invention is to provide an illumination system that has simpler structure and better color gamut and saturation, and can still effectively reduce the size and weight thereof.

To achieve the above objective, the present invention discloses an illumination system, which is used in a projection device and includes a light source module, a light splitting module, a light consolidating module and a waveband converting module.

The light source module includes a first light source for providing a first light beam of a first waveband.

The light splitting module includes a first light splitting element and a second light splitting element. The first light splitting element allows a light beam of the first waveband to pass through, and the second light splitting element allows a light beam of a second waveband to pass through.

The light consolidating module has a light output surface and a first light input surface. The light consolidating module reflects a light beam having an incident angle greater than a predetermined angel and allows a light beam having an incident angle smaller than the predetermined angel to pass through. The waveband converting module at least includes a first waveband converting zone.

The first light splitting element receives the first light beam and transmits the first light beam to the light consolidating module. The first light beam enters the light consolidating module through the first light input surface. The light consolidating module transmits the first light beam having an incident angle smaller than the predetermined angel to the first waveband converting zone so as to form the first light beam of a third waveband. The first light beam of the third waveband is transmitted from the waveband converting module to the light consolidating module, and then outputted through the light output surface of the light consolidating module.

In one embodiment of the invention, the light source module further includes a second light source for providing a second light beam of a second waveband.

In one embodiment of the invention, the second light splitting element receives the second light beam and transmits the second light beam to the light consolidating module. The second light beam enters the light consolidating module through the first light input surface. The light consolidating module transmits the second light beam having an incident angle smaller than the predetermined angel to the first converting zone so as to form the second light beam of the third waveband. The second light beam of the third waveband is transmitted from the waveband converting module to the light consolidating module, and then outputted through the light output surface of the light consolidating module.

In one embodiment of the invention, the first light source or the second light source is a laser array or a laser unit.

In one embodiment of the invention, the first light beam of the first waveband or the second light beam of the second waveband is a blue light beam.

In one embodiment of the invention, the first light beam of the third waveband or the second light beam of the third waveband is a yellow light beam or a yellow-green light beam.

In one embodiment of the invention, the illumination system further includes an optical transmission element for transmitting the light beams from the light consolidating module to the waveband converting module, and from the waveband converting module to the light consolidating module.

In one embodiment of the invention, the first light source is disposed at a first side of the first light splitting element, and the light consolidating module is disposed at a second side of the first light splitting element. The first side is opposite to the second side.

In one embodiment of the invention, the second light source is disposed at a first side of the second light splitting element, and the light consolidating module is disposed at a second side of the second light splitting element. The first side is opposite to the second side.

In one embodiment of the invention, the light source module further includes a third light source for providing a third light beam of a fourth waveband. The light splitting module further includes a third light splitting element for reflecting a light beam of the fourth waveband. The third light splitting element is disposed between the waveband converting module and the light consolidating module.

In one embodiment of the invention, the third light beam enters the light consolidating module through a second light input surface of the light consolidating module. The third light beam is transmitted from the light consolidating module to the third light splitting element. The third light splitting element reflects the third light beam, and the third light beam is transmitted to the light consolidating module, and then outputted through the light output surface.

In one embodiment of the invention, the first light beam of the third waveband or the second light beam of the third waveband is a yellow light beam or a yellow-green light beam, and the third light beam of the fourth waveband is a red light beam.

In one embodiment of the invention, the waveband converting module further includes a second waveband converting zone.

In one embodiment of the invention, the light consolidating module transmits the second light beam having an incident angle smaller than the predetermined angel to the second waveband converting zone so as to form the second light beam of a fourth waveband. The second light beam of the fourth waveband is transmitted from the waveband converting module to the light consolidating module, and then outputted through the light output surface.

In one embodiment of the invention, the light splitting module further includes a fourth light splitting element and a fifth light splitting element.

In one embodiment of the invention, the fourth light splitting element allows a light beam of the second waveband to pass through and reflecting a light beam of a fourth waveband. The fourth light splitting element is disposed at a first side of the second light splitting element. The fifth light splitting element allows a light beam of the first waveband to pass through and reflecting a light beam of the third waveband. The fifth light splitting element is disposed at a second side of the first light splitting element. The fifth light splitting element and the first light splitting element form an included angle.

In one embodiment of the invention, the first light splitting element and the fifth light splitting element are integrated as a single component, and the second light splitting element and the fourth light splitting element are integrated as a single component.

In one embodiment of the invention, the fifth light splitting element and the fourth light splitting element form a first included angle, and the first included angle ($\theta_1$), the effective focal length (f) of an optical transmission element, and the distance (d) between the centers of the first waveband converting zone and the second waveband converting zone fit the equation of: $2\theta_1 = \tan^{-1}(d/f)$.

In one embodiment of the invention, the first light source and the second light source form a second included angle, and the second included angle ($\theta_2$), the effective focal length (f) of an optical transmission element, and the distance (d) between the centers of the first waveband converting zone and the second waveband converting zone fit the equation of: $\theta_2 = \tan^{-1}(d/f)$.

In one embodiment of the invention, the first light beam of the third waveband or the second light beam of the third waveband is a green light beam, and the first light beam of the fourth waveband or the second light beam of the fourth waveband is a red light beam.

The present invention also discloses a projection device, which includes an imaging system and any one of the above mentioned illumination systems. The illumination system provides a light beam composed of the first waveband light beam, the second waveband light beam and the third waveband light beam. The imaging system uses the light beam provided by the illumination system to form an image.

As mentioned above, the invention configures the light splitting module and the light consolidating module, which can cooperate to reduce the light loss. Besides, the light consolidating module can transmit and receive the light beams, so that the light paths can be centralized within a specific space. This configuration can further simplify the entire illumination system so as to reduce the size and weight of the illumination system. In addition, the illumination system further includes the waveband converting module, so that it can provide better gamut and saturation.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

In the following embodiments and related figures, the minor components which are not directly relative to the invention are omitted and not shown. Besides, the relative dimensions of the components shown in the figures are for illustrations only and are not to limit the scope of the invention.

In order to make the descriptions more clear, the light beams of different wavebands in the following embodiments will be shown as different types of lines.

The projection device used in the embodiments can be a DLP (digital light processing) projector or a device with projection function such as a LCD (liquid crystal display) device or LCOS system (liquid crystal on silicon system). Moreover, the projection device of the embodiments can be a three-panel DLP projector.

Figure 1:
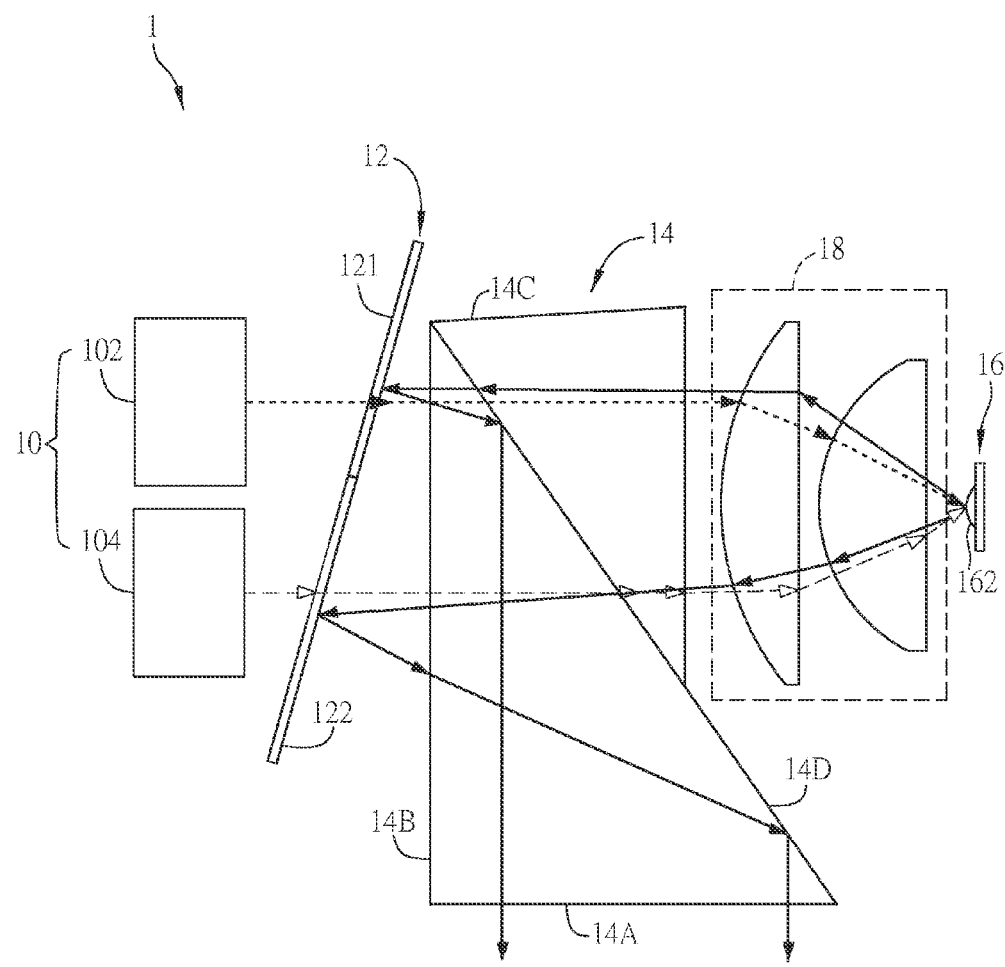
FIG. 1 is a schematic diagram showing an illumination system according to a first embodiment of the invention.
Figure 2:
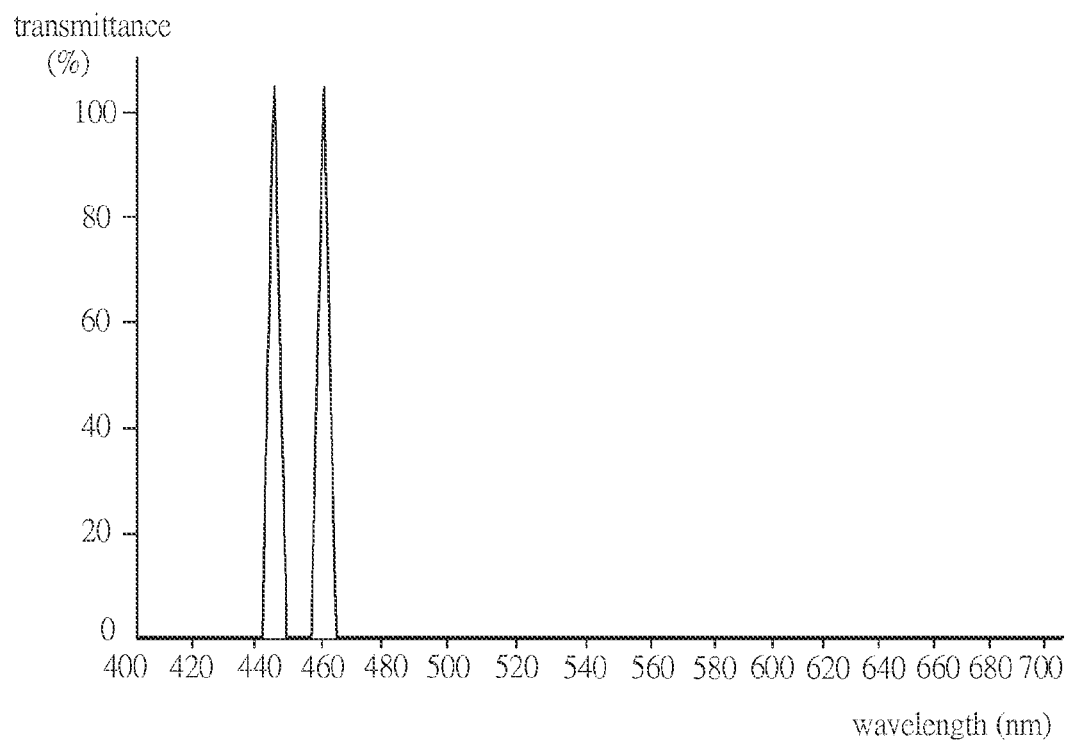
FIG. 2 is a schematic diagram showing the wavelength and transmittance of the embodiment of FIG. 1.
Figure 3:
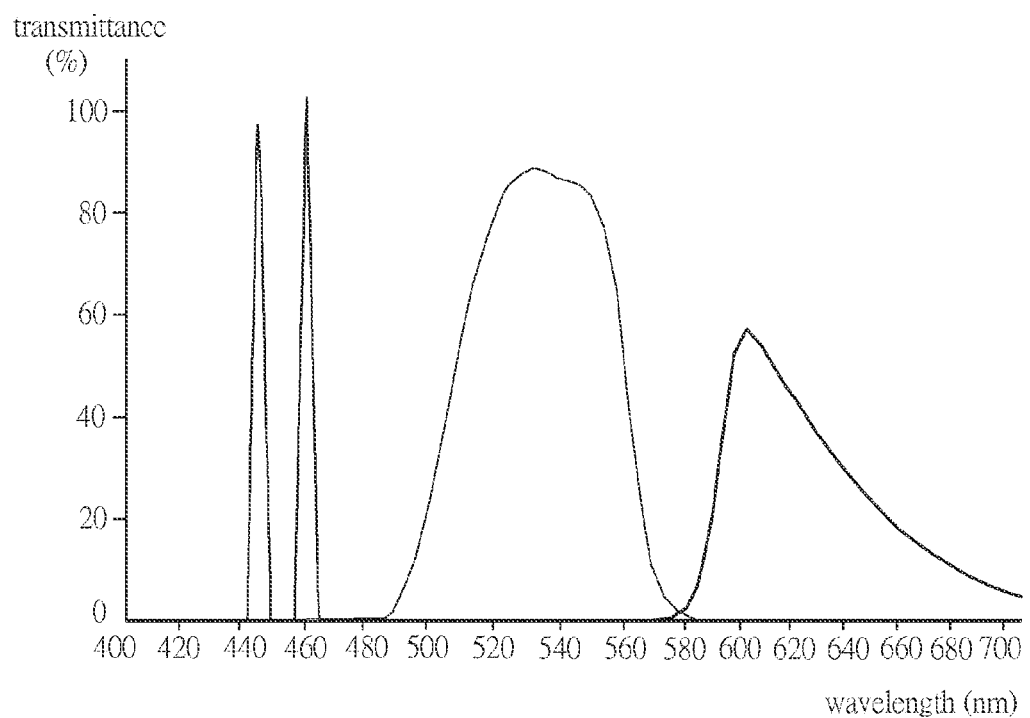
FIG. 3 is a schematic diagram showing the wavelength and transmittance of the light beam of the third waveband of FIG. 2, which has traveled through a dichroic element.

FIG. 1 is a schematic diagram showing an illumination system according to a first embodiment of the invention, FIG. 2 is a schematic diagram showing the wavelength and transmittance of the embodiment of FIG. 1, and FIG. 3 is a schematic diagram showing the wavelength and transmittance of the light beam of the third waveband of FIG. 2, which has traveled through a dichroic element.

The illumination system 1 of this embodiment includes a light source module 10, a light splitting module 12, a light consolidating module 14 and a waveband converting module 16.

The light source module 10 includes a first light source 102 for providing a first light beam of a first waveband. Moreover, the light source module 10 may further include a second light source 104, if necessary, for providing a second light beam of a second waveband. The light sources described herein can provide multiple light beams. For example, the first light source 102 can provide multiple first light beams of the first waveband. In other words, the term of "the first light beam" in the following description refers to at least one of the light beams emitted from the first light source.

The first light source 102 or the second light source 104 is a laser array or a laser unit. In this embodiment, the first light beam of the first waveband and the second light beam of the second waveband are blue light, wherein the first waveband is about 445 nm and the second waveband is about 460 nm. In addition, the waveband described herein can be a specific wavelength or a wavelength range, which is not to limit the scope of the invention. The critical point is that the first and second wavebands are not overlapped.

In this embodiment, the first light source 102 and the second light source 104 are disposed in parallel and adjacent to each other.

The light splitting module 12 includes a first light splitting element 121 and a second light splitting element 122. The first light splitting element 121 allows the light beam of the first waveband to pass through, and reflects the light beam of the waveband other than the first waveband. The second light splitting element 122 allows the light beam of the second waveband to pass through, and reflects the light beam of the waveband other than the second waveband. In this embodiment, each of the first light splitting element 121 and the second light splitting element 122 can be a dichroic mirror.

The light consolidating module 14 has a light output surface 14A and a first light input surface 14B. Moreover, the light consolidating module 14 may further include a second light input surface 14C and a total-reflection interface 14D. The first light input surface 14B is disposed next to the light output surface 14A and the second light input surface 14C, and the second light input surface 14C is disposed opposite to the light output surface 14A. The total-reflection interface 14D of the light consolidating module 14 is capable of reflecting the light beam having an incident angle larger than a predetermined angle, while the light beam having an incident angle smaller than the predetermined angel will pass through the total-reflection interface 14D. In this embodiment, the light consolidating module 14 is a total reflection prism, and the predetermined angle is the threshold angle of the incident angle entering the total-reflection interface 14D (e.g. 41 degrees).

The waveband converting module 16 at least includes a first waveband converting zone 162. In this embodiment, the first waveband converting zone 162 can be coated with yellow fluorescent material or yellow-green fluorescent material, so that the light beam enters the first waveband converting zone 162 will be excited and then converted into a yellow-green light beam (450-710 nm).

In this embodiment, the illumination system 1 further includes an optical transmission element 18 such as a lens set. The optical transmission element 18 is used for transmitting the light beams from the light consolidating module 14 to the waveband converting module 16, and from the waveband converting module 16 to the light consolidating module 14.

With reference to FIG. 1 again, the first light source 102 is disposed at the first side (left side) of the first light splitting element 121, while the light consolidating module 14 is disposed at the second side (right side) of the first light splitting element 121. Alternatively, the second side of the first light splitting element 121 is opposite to the light consolidating module 14. Herein, the first and second sides of the first light splitting element 121 are disposed opposite to each other.

The second light source 104 is disposed at the first side (left side) of the second light splitting element 122, while the light consolidating module 14 is disposed at the second side (right side) of the second light splitting element 122. Alternatively, the second side of the second light splitting element 122 is opposite to the light consolidating module 14. Herein, the first and second sides of the second light splitting element 122 are disposed opposite to each other.

The light paths traveling within the illumination system 1 will be described hereinafter. At first, the light path of the first light beam provided by the first light source 102 will be discussed.

The first light splitting element 121 receives the first light beam of the first waveband provided by the first light source 102. Then, the first light splitting element 121 transmits the first light beam to the light consolidating module 14. In this case, the first light beam enters the light consolidating module 14 through the first light input surface 14B.

If the incident angle of the first light beam is smaller than a predetermined angle (e.g. 41 degrees), the light consolidating module 14 transmits the first light beam to the first waveband converting zone 162. In other words, the first light beam of the first waveband will be converged to the first waveband converting zone 162. Then, the first light beam of the first waveband can be partially excited to form a first light beam of a third waveband.

Afterwards, the first light beam of the third waveband is transmitted from the waveband converting module 16 to the light consolidating module 14, and then outputted through the light output surface 14A. In other words, the first light beam is converted before entering the light consolidating module 14, directly reflected and transmitted to the second light splitting element 122, reflected to enter the light consolidating module 14 (the incident angle will be larger than the predetermined angle at this moment), and then reflected to leave the light output surface 14A.

In order to make the figures more clear, only the first light beam of the third waveband is shown, wherein the light paths of the first light beams of the first waveband (not excited) and the third waveband (excited) are similar.

In brief, according to the above configuration, the waveband converting module 16 can convert the entered first light beam of the first waveband into the first light beam of the third waveband (yellow or yellow-green light). In this case, a part of the incident first light beam of the first waveband is not converted into the yellow light, and the residual unconverted first light beam of the first waveband may have increase proportion as the total quantity of the incident first light beam increases.

The light path of the second light beam provided by the second light source 104 will be discussed herein below.

The second light splitting element 122 receives the second light beam of the second waveband provided by the second light source 104. Then, the second light splitting element 122 transmits the second light beam to the light consolidating module 14. In this case, the second light beam enters the light consolidating module 14 through the first light input surface 14B.

If the incident angle of the second light beam is smaller than a predetermined angle (e.g. 41 degrees), the light consolidating module 14 transmits the second light beam to the first waveband converting zone 162. In other words, the second light beam of the second waveband will be converged to the first waveband converting zone 162. Then, the second light beam of the second waveband can be excited to form a second light beam of a third waveband.

Afterwards, the second light beam of the third waveband is transmitted from the waveband converting module 16 to the light consolidating module 14, and then outputted through the light output surface 14A. In other words, the second light beam is converted before entering the light consolidating module 14, directly reflected and transmitted to the first light splitting element 121 (the incident angle will be larger than the predetermined angle at this moment), reflected to enter the light consolidating module 14, and then reflected by the total-reflection interface 14D, and leaves through the light output surface 14A.

In order to make the figures more clear, only the second light beam of the third waveband is shown, wherein the light paths of the second light beams of the second waveband and the third waveband are similar.

In brief, according to the above configuration, the waveband converting module 16 can convert the entered second light beam of the second waveband into the second light beam of the third waveband (yellow or yellow-green light). In this case, a part of the incident second light beam of the second waveband is not converted into the yellow light, and the residual unconverted second light beam of the second waveband may have increase proportion as the total quantity of the incident second light beam increases.

The illumination system 1 at least provides a first light beam of the first waveband (blue light), a second light beam of the second waveband (blue light), a first light beam of the third waveband (yellow or yellow-green light), and a second light beam of the third waveband (yellow or yellow-green light).

Referring to FIGS. 2 and 3, the third waveband is between a green light waveband and a red light waveband, so the light beam of the third waveband is a yellow or yellow-green light beam. In brief, the first waveband converting zone 162 can excite the first or second waveband light beam (blue light) and convert it to form the third waveband light beam (between red and green lights).

In addition, FIG. 3 shows a white light beam formed by combining the red, green and blue lights, wherein the green and red lights are separated after passing through a dichroic element of an image processing device (not shown). Besides, since the human vision is much more sensitive to the green light than the red light, it is possible and desired to adjust the illuminance and brightness of the green or red light depending on the requirements.

Herein, the white light beam can be formed by a light-homogenized element such as an integration rod or a light tunnel.

As mentioned above, the above embodiment uses the light splitting module 12 and the light consolidating module 14 to transmit the light provided by the light source module 10 to the waveband converting module 16. Accordingly, the illumination system can be fabricated with simpler structure and better color gamut and saturation.

Figure 4A:
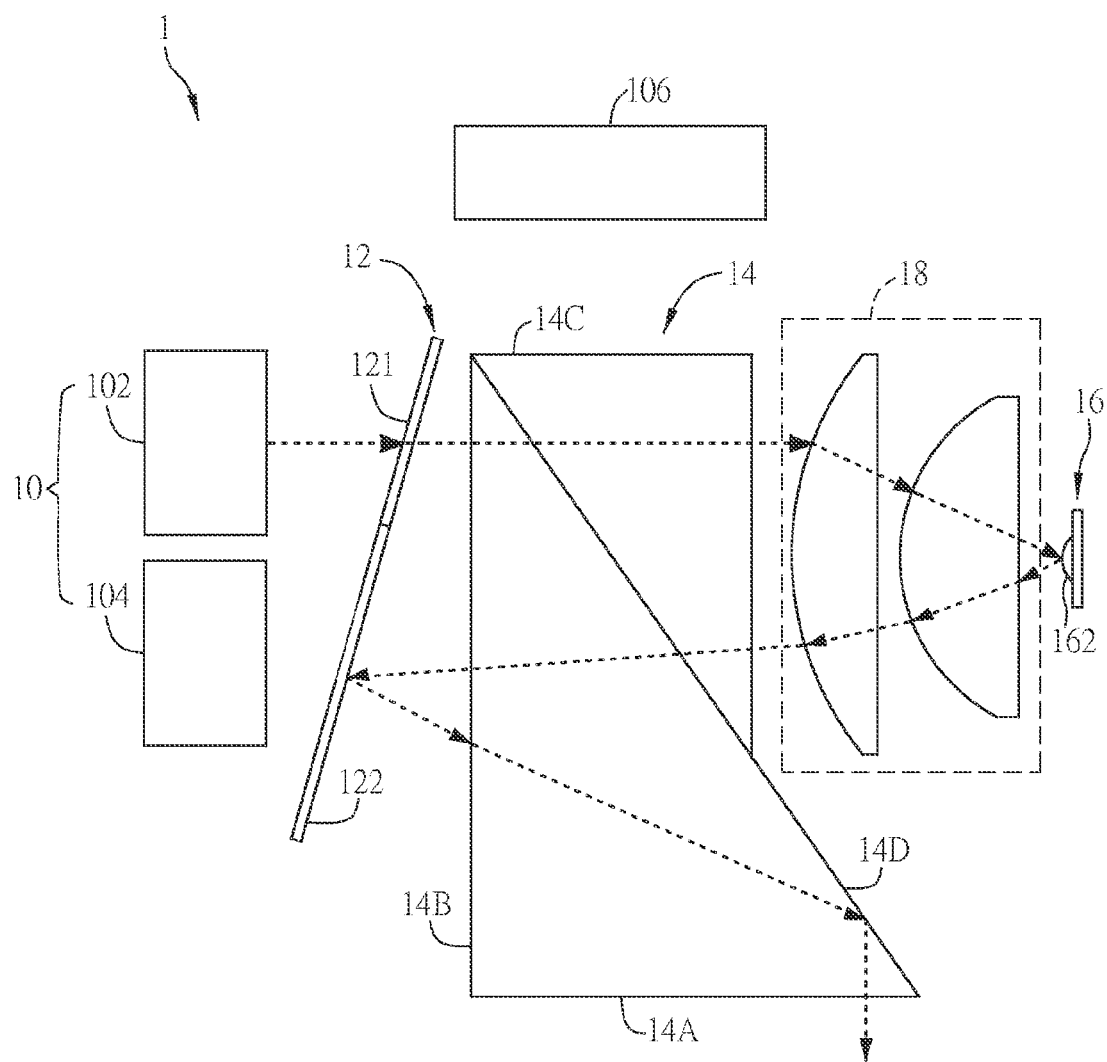
FIG. 4A is a schematic diagram showing an illumination system according to a second embodiment of the invention and the blue light path from the first light source of the illumination system.
Figure 4B:
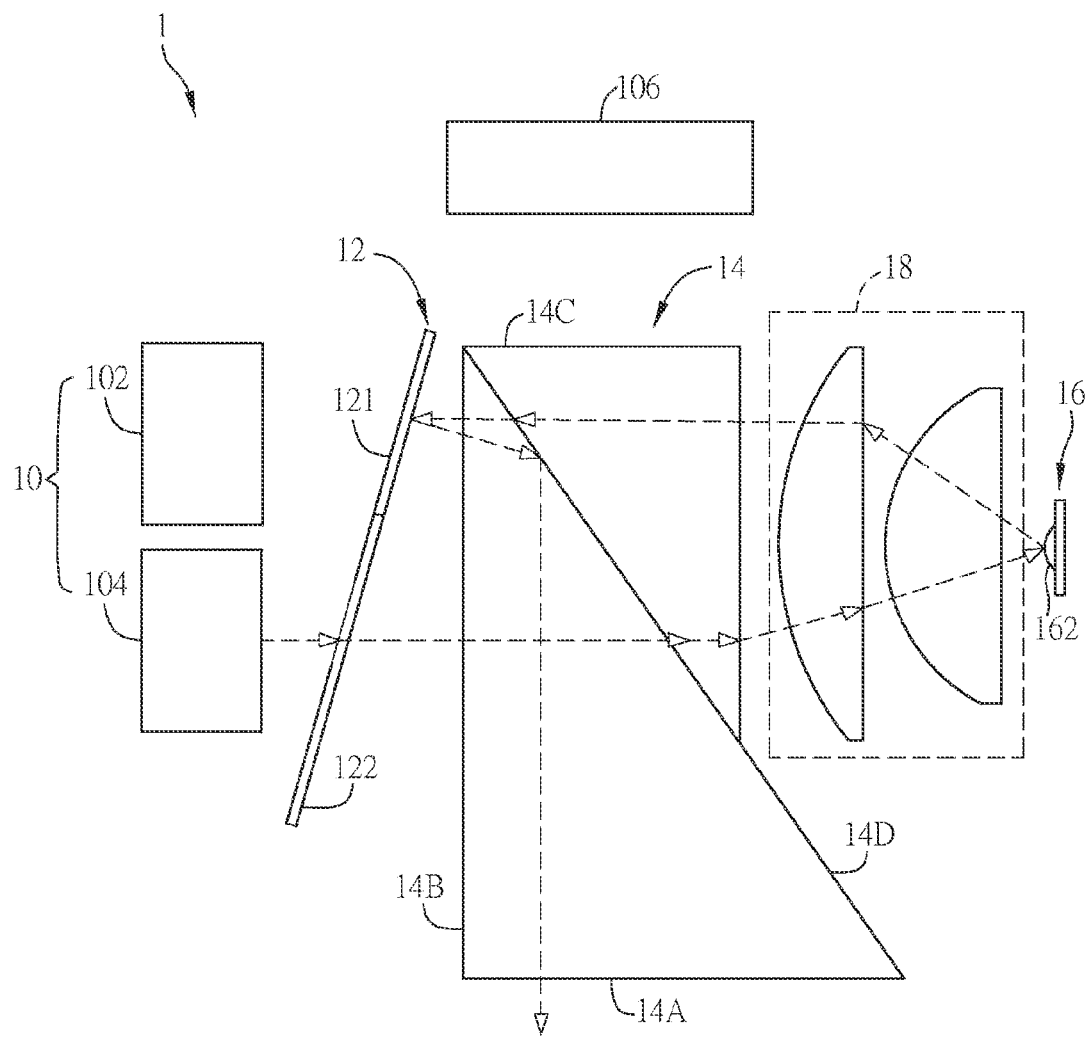
FIG. 4B is a schematic diagram showing the illumination system according to the second embodiment of the invention and the blue light path from the second light source of the illumination system.
Figure 4C:
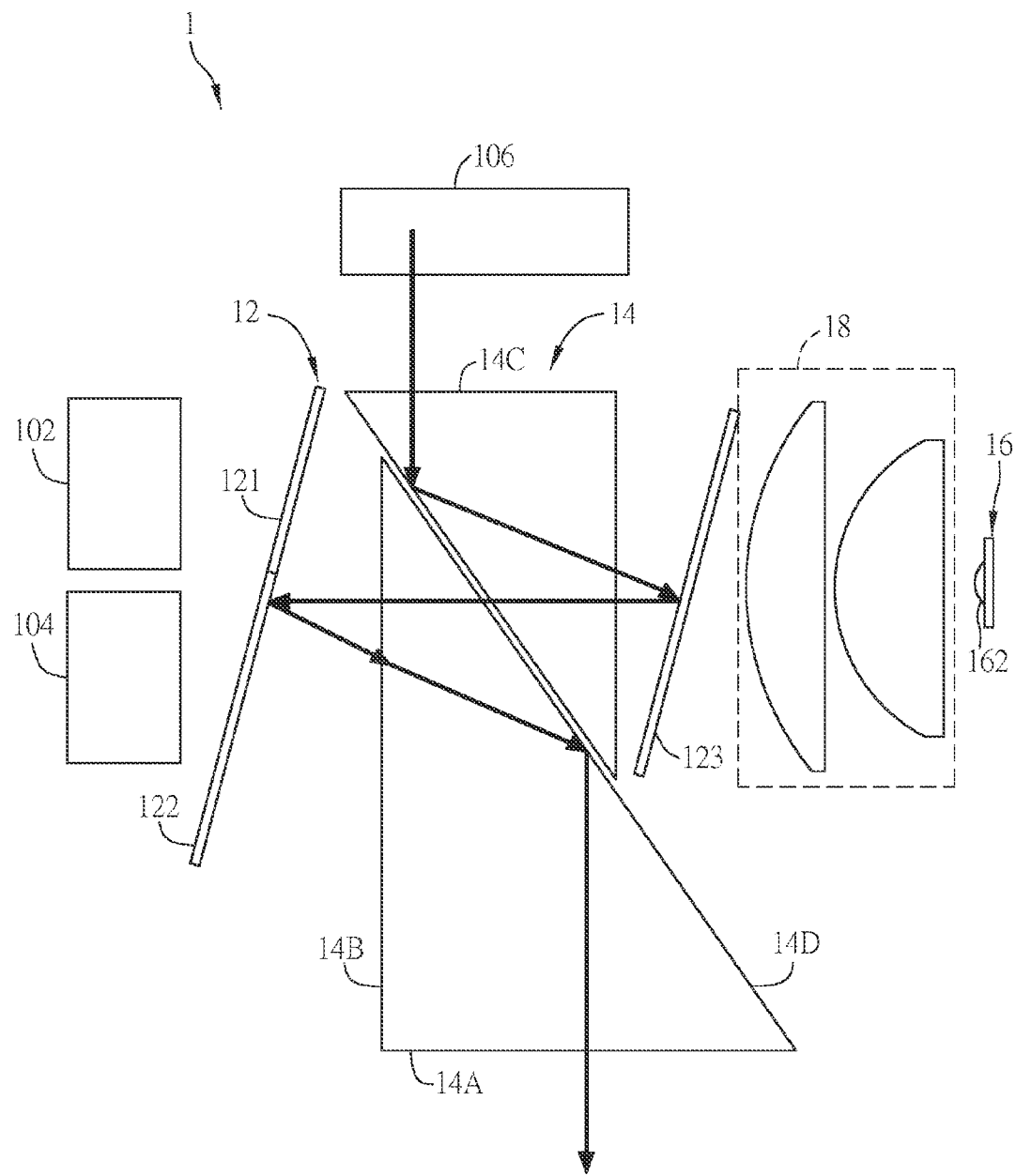
FIG. 4C is a schematic diagram showing the illumination system according to the second embodiment of the invention and the added red laser path.
Figure 4D:
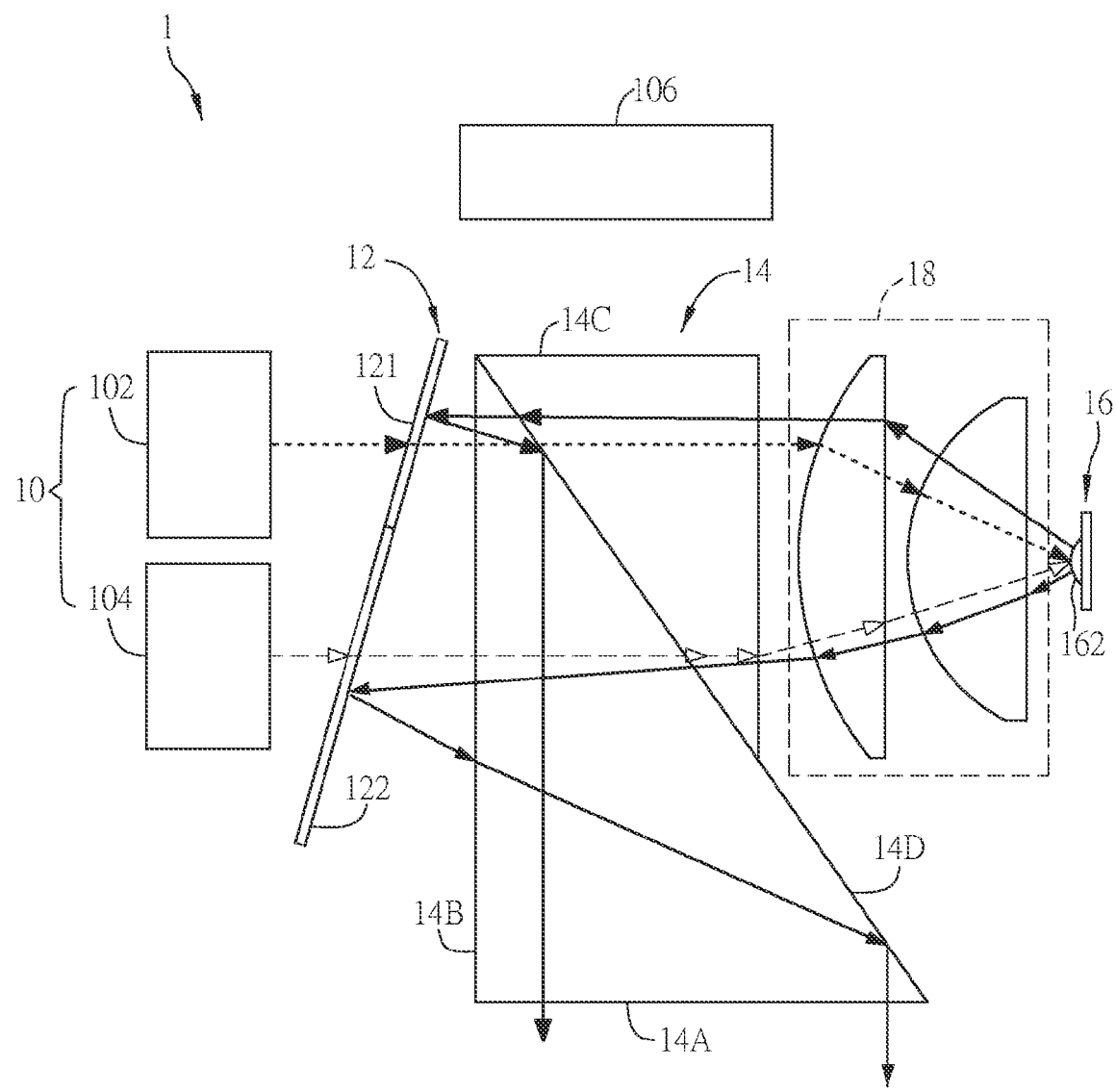
FIG. 4D is a schematic diagram showing the illumination system according to the second embodiment of the invention and the excited yellow fluorescent light path.
Figure 5:
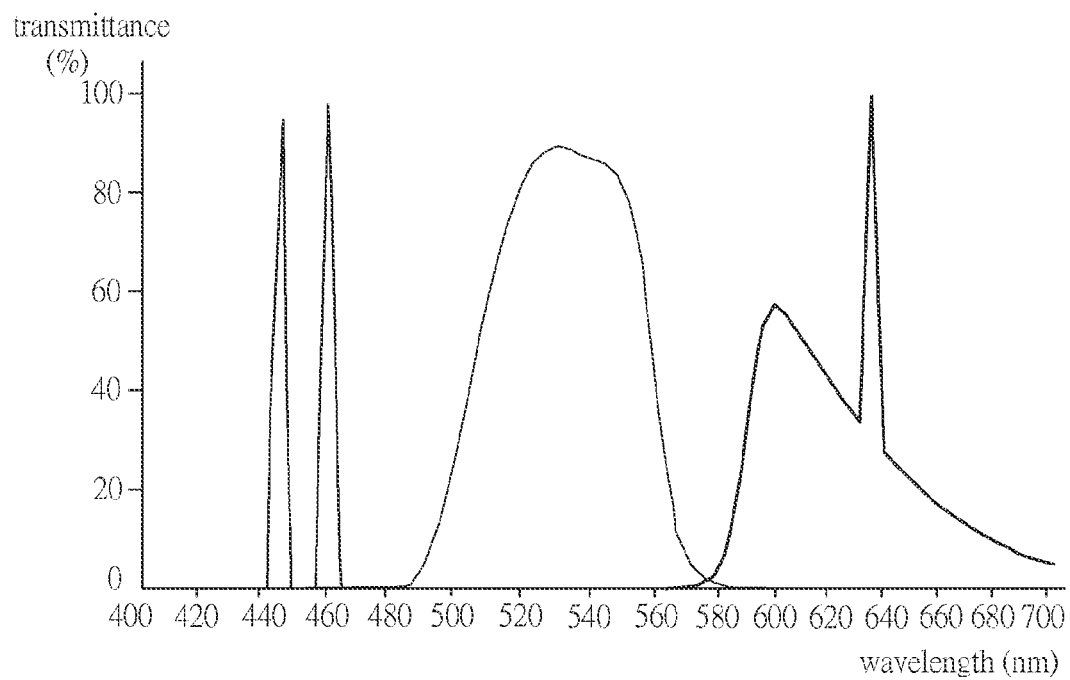
FIG. 5 is a schematic diagram showing the wavelength and transmittance of the light beam of the third waveband of FIGS. 4A to 4D, which has traveled through a dichroic element.

FIGS. 4A and 4B are schematic diagrams showing an illumination system according to a second embodiment of the invention and the blue light paths from the first light source and the second light source of the illumination system. FIG. 4C is a schematic diagram showing the illumination system according to the second embodiment of the invention and the added red laser path. FIG. 4D is a schematic diagram showing the illumination system according to the second embodiment of the invention and the excited yellow fluorescent light path. FIG. 5 is a schematic diagram showing the wavelength and transmittance of the light beam of the third waveband of FIGS. 4A to 4D, which has traveled through a dichroic element.

FIGS. 4A and 4B show the first light source 102 and the second light source 104 as well as the first light beam of the first waveband and the second light beam of the second waveband, which are not excited yet. FIG. 4C shows the third light beam of the fourth waveband provided by an added third light source 106. FIG. 4D shows the first light source 102 and the second light source 104 as well as the converted light beams of the third waveband. However, the paths shown in the figures are for illustrations only and not to limit the traveling paths of the invention.

The light paths of the first light source 102 and the second light source 104, other components and the relations of the components are similar to those of the first embodiment, so the detailed descriptions thereof will be omitted.

Only the difference between the first and second embodiments will be discussed hereinafter for concise purpose.

Different from the previous embodiment, the light source module 10 of the second embodiment further includes a third light source 106, and the light splitting module 12 further includes a third light splitting element 123.

In this embodiment, the third light source 106 is disposed at the second light input surface 14C of the light consolidating module 14, while the third light splitting element 123 is disposed between the waveband converting module 16 and the light consolidating module 14.

In more detailed, the third light source 106 of this embodiment provides a third light beam of a fourth waveband. Herein, the third light beam of the fourth waveband is a red light.

The third light splitting element 123 of the light splitting module 12 can reflect the light beam of the fourth waveband. In other words, the first light beam of the first waveband (blue light), the second light beam of the second waveband (blue light), the first light beam of the third waveband (yellow or yellow-green light) and the second light beam of the third waveband (yellow or yellow-green light) can all transmit through the third light splitting element 123.

Referring to FIG. 4C, the third light beam of the fourth waveband enters the light consolidating module 14 through the second light input surface 14. The third light beam is transmitted from the light consolidating module 14 to the third light splitting element 123. The third light splitting element 123 reflects the third light beam, and the third light beam is transmitted to the light consolidating module 14, and then outputted through the light output surface 14A. In brief, the third light beam of the fourth waveband will not be transmitted toward the waveband converting module 16.

In this embodiment, the first light beam of the third waveband or the second light beam of the third waveband is a yellow or yellow-green light, and the third light beam of the fourth waveband is a red light.

Referring to FIG. 5, after passing through a dichroic element of an image processing device (not shown), the green and red lights are separated from the light beam of the third waveband, and then the red, green and blue lights are combined to form a white light beam. Herein, the red light is composed of the first light beam of the third waveband, the second light beam of the third waveband and the third light beam of the fourth waveband. Compared with the first embodiment, this embodiment further configures a third light source 106, so that the illumination system 1 can have boarder color gamut, better saturation and higher brightness.

Figure 6A:
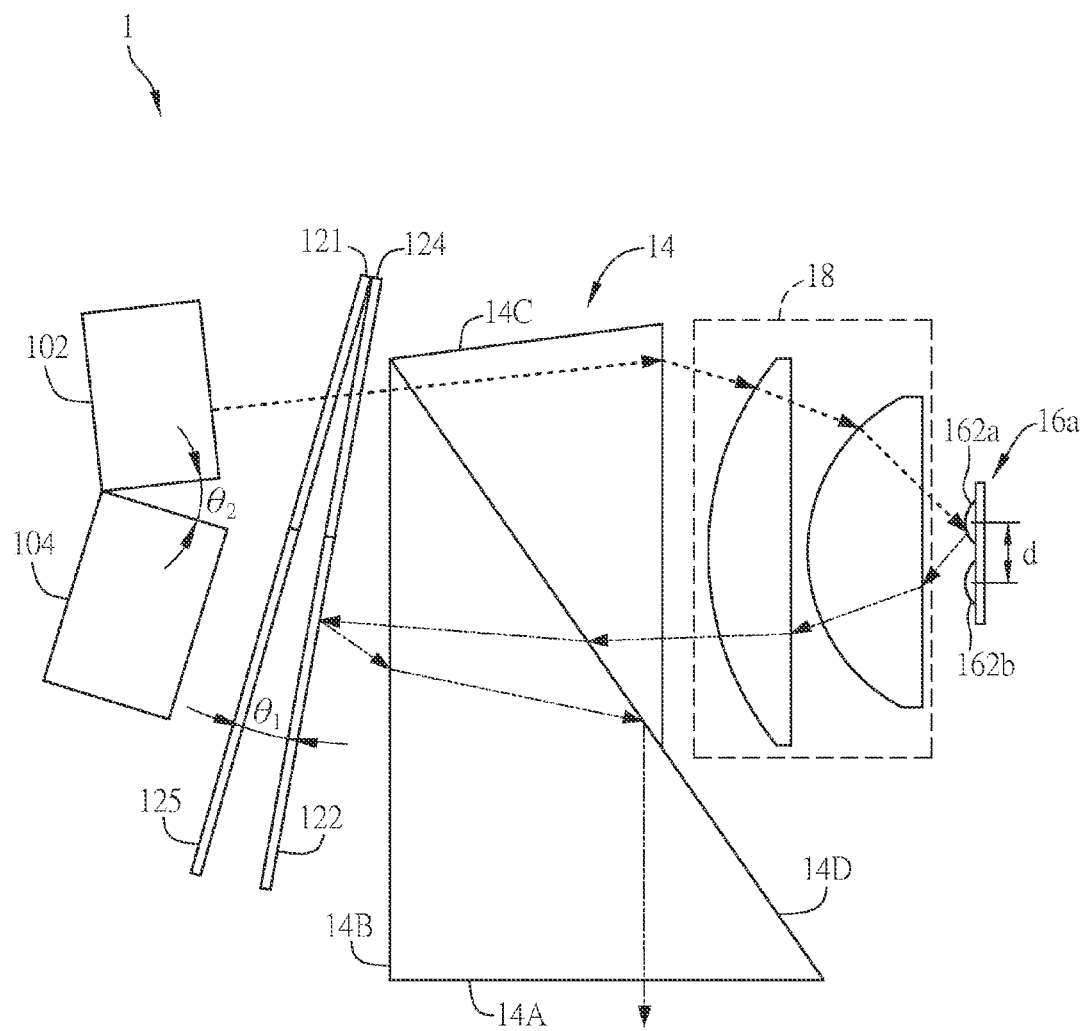
FIG. 6A is a schematic diagram showing an illumination system according to a third embodiment of the invention.
Figure 6B:
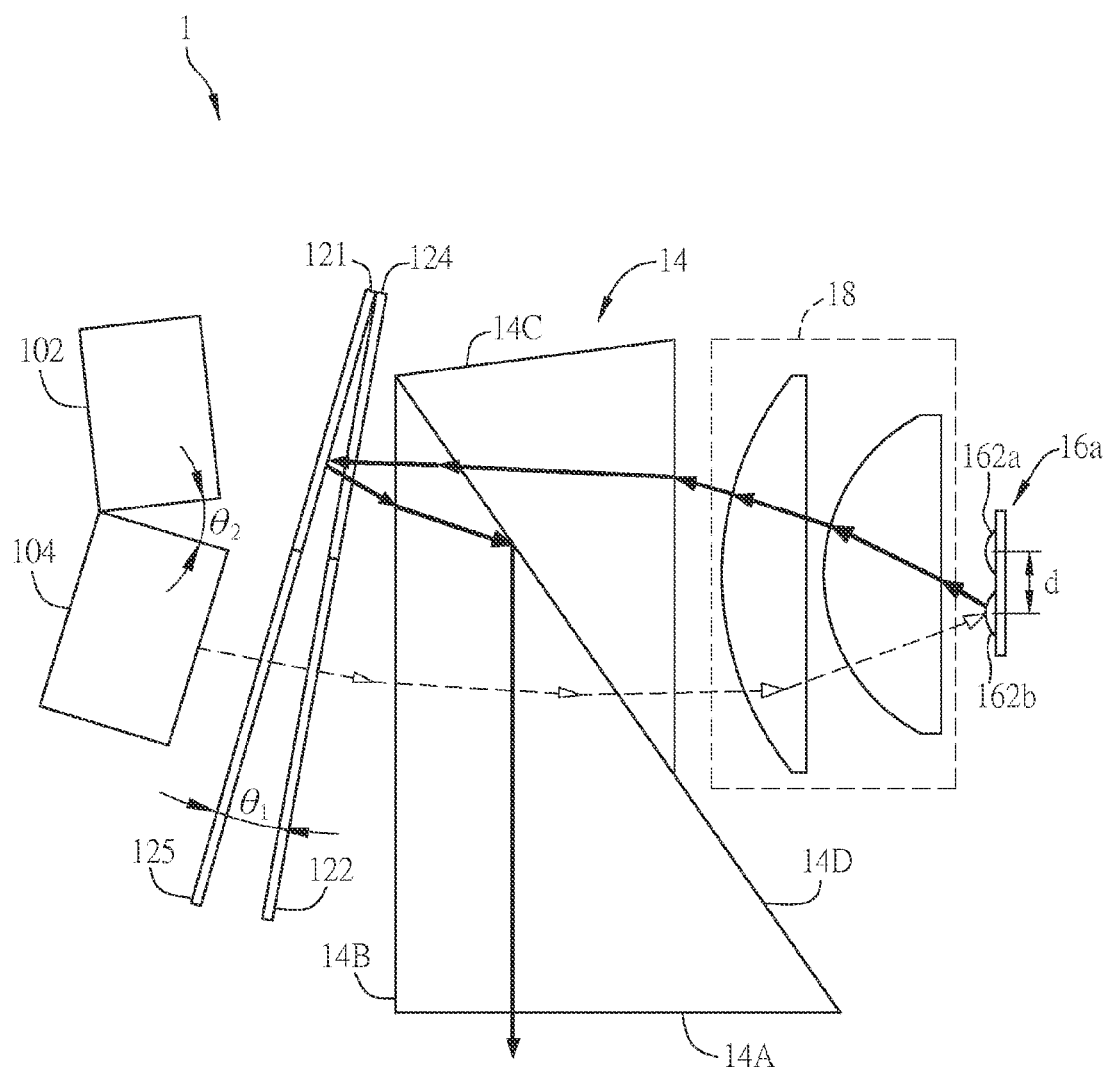
FIG. 6B is another schematic diagram showing the illumination system according to the third embodiment of the invention.
Figure 7:
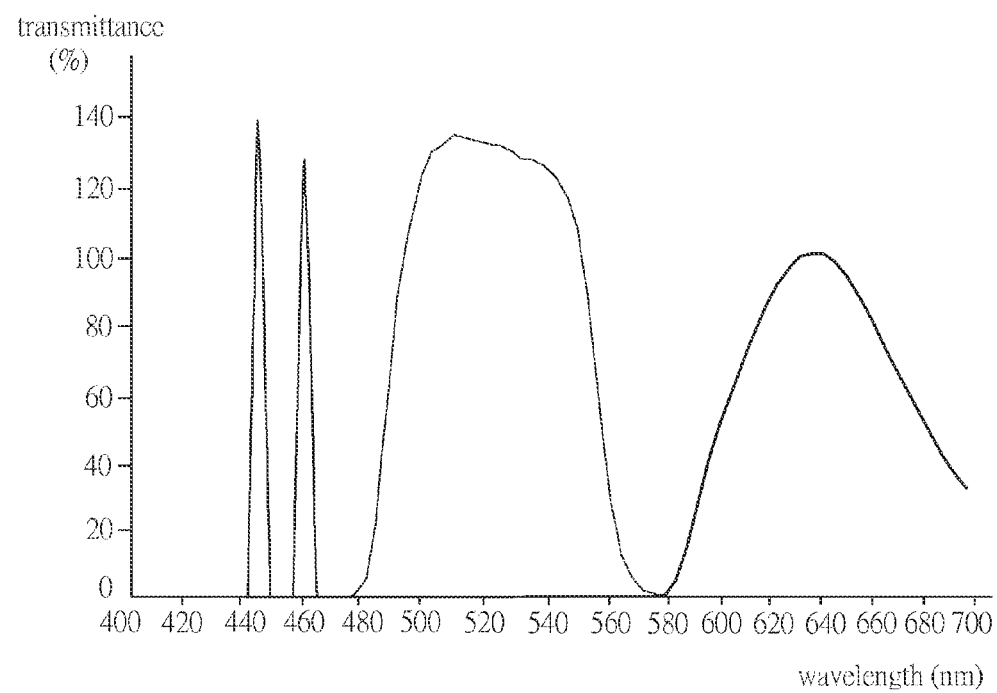
FIG. 7 is a schematic diagram showing the wavelength and transmittance of the light beam of the third waveband of FIGS. 6A to 6B, which has traveled through a dichroic element.

FIGS. 6A and 6B are schematic diagrams showing an illumination system according to a third embodiment of the invention, and FIG. 7 is a schematic diagram showing the wavelength and transmittance of the light beam of the third waveband of FIGS. 6A and 6B, which has traveled through a dichroic element.

The waveband converting module 16a of the third embodiment further includes a second waveband converting zone 162b. Herein, the first waveband converting zone 162a is coated with a green fluorescent material, and the second waveband converting zone 162b is coated with a red fluorescent material.

The light splitting module 12 of the third embodiment may further include a fourth light splitting element 124 and a fifth light splitting element 125. Each of the fourth light splitting element 124 and the fifth light splitting element 125 can be a dichroic mirror.

The fourth light splitting element 124 allows the light beam of the second waveband to pass through, and reflects the light beam of the waveband other than the second waveband. The fourth light splitting element 124 is disposed at the first side (left side) of the second light splitting element 122.

The fifth light splitting element 125 allows the light beam of the first waveband to pass through, and reflects the light beam of the waveband other than the first waveband. The fifth light splitting element 125 is disposed at the second side (right side) of the first light splitting element 121.

The fifth light splitting element 125 and the fourth light splitting element 124 form a first included angle $\theta_1$, and the first light source 102 and the second light source 104 form a second included angle ($\theta_2$). The values of $\theta_1$ and $\theta_2$ are in positive proportion to the distance between the centers of the first waveband converting zone 162a and the second waveband converting zone 162b, wherein $\theta_2=2\theta_1$.

In more specific, the value of the first included angle $\theta_1$, the effective focal length f of the optical transmission element 18, and the distance d between the centers of the first waveband converting zone 162a and the second waveband converting zone 162b are fitted in the equation of: $2\theta_1=\tan^{-1}(d/f)$. Besides, the second included angle $\theta_2$, the effective focal length f of the optical transmission element 18, and the distance d between the centers of the first waveband converting zone 162a and the second waveband converting zone 162b are fitted in the equation of: $\theta_2=\tan^{-1}(d/f)$.

The first light splitting element 121 and the fifth light splitting element 125 are integrated as a single component, and the second light splitting element 122 and the fourth light splitting element 124 are integrated as a single component. Alternatively, in other embodiments, the first light splitting element 121, the second light splitting element 122 the fourth light splitting element 124 and the fifth light splitting element 125 are integrated as a single component, such as a wedged structure.

The light path of the first light beam provided by the first light source 102 will be discussed hereinafter.

Referring to FIG. 6, the first light beam of the first waveband provided by the first light source 102 passes through the first light splitting element 121 and the fourth light splitting element 124, and then enters the light consolidating module 14 through the first light input surface 14B.

If the incident angle of the first light beam is smaller than a predetermined angle (e.g. 41 degrees), the light consolidating module 14 transmits the first light beam to the first waveband converting zone 162a so as to form the first light beam of the third waveband or the first light beam of the fourth waveband. In other words, the first light beam of the first waveband will be converged to the first waveband converting zone 162a. Then, the first light beam of the first waveband can be partially excited to form the first light beam of the third waveband.

Afterwards, the first light beam of the third waveband (green light) is transmitted from the waveband converting module 16a to the light consolidating module 14. The first light beam of the third waveband and the unexcited first light beam of the first waveband are then reflected by the second light splitting element 122 and the fourth light splitting element 124, and outputted through the light output surface 14A of the light consolidating module 14.

The light path of the second light beam provided by the second light source 104 will be discussed hereinafter.

The second light beam of the second waveband provided by the second light source 104 passes through the second light splitting element 122 and the fifth light splitting element 125, and then enters the light consolidating module 14 through the first light input surface 14B.

If the incident angle of the second light beam is smaller than a predetermined angle (e.g. 41 degrees), the light consolidating module 14 transmits the second light beam to the second waveband converting zone 162b so as to form the second light beam of the fourth waveband. In other words, the second light beam of the second waveband will be converged to the second waveband converting zone 162b. Then, the second light beam of the second waveband can be partially excited to form the second light beam of the third or fourth waveband.

Afterwards, the second light beam of the fourth waveband is transmitted from the waveband converting module 16a to the light consolidating module 14. The second light beam of the fourth waveband and the unexcited second light beam of the second waveband are then reflected by the first light splitting element 121 and the fifth light splitting element 125, and outputted through the light output surface 14A.

In this embodiment, the first light beam of the third waveband is a green light, and the second light beam of the fourth waveband is a red light.

In order to make the figures more clear, only half of the excited first light beam of the third waveband and the excited second light beam of the fourth waveband is shown in FIGS. 6A and 6B (not all possible paths of the excited light beams are shown). Herein, the unexcited first light beam of the first waveband and the unexcited second light beam of the second waveband are not shown in the figures. However, those skilled in the art can fully understand and easily realize according to the figures.

To be noted, the above embodiments can all be applied to the projection device. For example, the projection device includes an imaging system and at least one of the above mentioned illumination systems. According to different aspects of the above embodiments, the illumination system can provide the light at least composed of the first waveband light beam, the second waveband light beam and the third waveband light beam.

Figure 8:
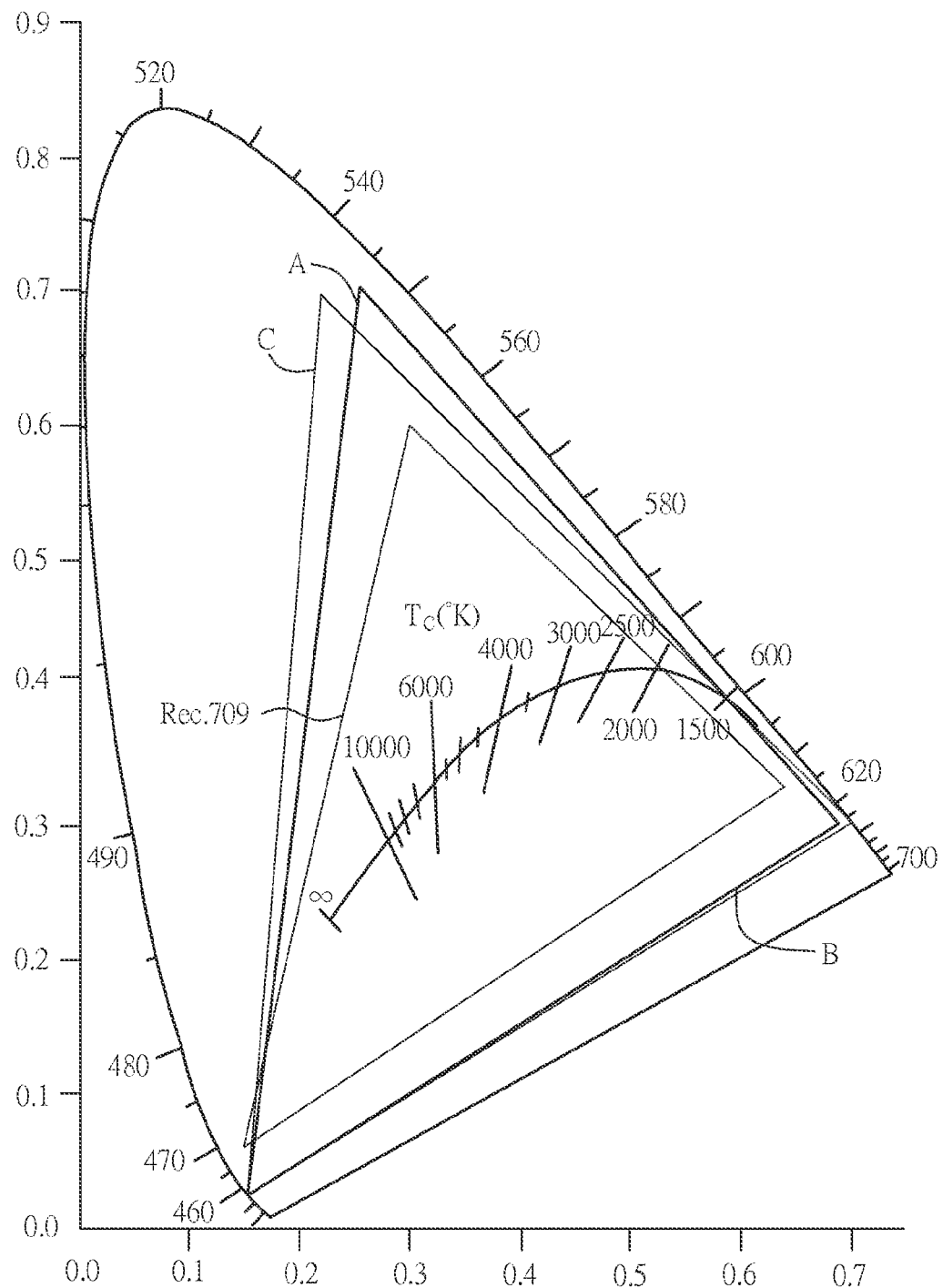
FIG. 8 is a chromaticity diagram showing the color expressions in the first, second and third embodiments.

FIG. 8 is a chromaticity diagram showing the color expressions in the first, second and third embodiments.

Referring to FIG. 8, "rec. 709" in the chromaticity diagram represents the CIE color gamut standard. The region A, region B and region C represent the chromaticity diagrams of the first, second and third embodiments, respectively, which are all within the color expression of rec. 709.

According to FIG. 8, the third embodiment (region C) further uses the green and red fluorescent light, so it has better tints and brightness than the first embodiment (region A). The second embodiment (region B) compensates the weakness of red light in the first embodiment (region A), so that the entire tint is modified toward the red chromaticity point. When the chromaticity region increases, it means that the color saturation of the illumination system is enhanced.

In summary, the invention configures the light splitting module and the light consolidating module, which can cooperate to reduce the light loss. Besides, the light consolidating module can transmit and receive the light beams, so that the light paths can be centralized within a specific space. This configuration can further simplify the entire illumination system so as to reduce the size and weight of the illumination system. In addition, the illumination system further includes the waveband converting module, so that it can provide better gamut and saturation.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. An illumination system used in a projection device, comprising:
   a light source module comprising a first light source for providing a first light beam of a first waveband;
   a light splitting module comprising:
   a first light splitting element allowing a light beam of the first waveband to pass through, and
   a second light splitting element allowing a light beam of a second waveband to pass through;
   a light consolidating module having a light output surface and a first light input surface, wherein the light consolidating module reflects a light beam having an incident angle greater than a predetermined angel and allows a light beam having an incident angle smaller than the predetermined angel to pass through; and
   a waveband converting module comprising a first waveband converting zone;
   wherein, the first light splitting element receives the first light beam and transmits the first light beam to the light consolidating module, the first light beam enters the light consolidating module through the first light input surface, the light consolidating module transmits the first light beam having an incident angle smaller than the predetermined angel to the first waveband converting zone so as to form the first light beam of a third waveband, and the first light beam of the third waveband is transmitted from the waveband converting module to the light consolidating module, and then outputted through the light output surface of the light consolidating module.

2. The illumination system of claim 1, wherein the light source module further comprises a second light source for providing a second light beam of a second waveband.

3. The illumination system of claim 2, wherein the second light splitting element receives the second light beam and transmits the second light beam to the light consolidating module, the second light beam enters the light consolidating module through the first light input surface, the light consolidating module transmits the second light beam having an incident angle smaller than the predetermined angel to the first converting zone so as to form the second light beam of the third waveband, and the second light beam of the third waveband is transmitted from the waveband converting module to the light consolidating module, and then outputted through the light output surface of the light consolidating module.

4. The illumination system of claim 2, wherein the first light source or the second light source is a laser array or a laser unit.

5. The illumination system of claim 2, wherein the first light beam of the first waveband or the second light beam of the second waveband is a blue light beam.

6. The illumination system of claim 3, wherein the first light beam of the third waveband or the second light beam of the third waveband is a yellow light beam or a yellow-green light beam.

7. The illumination system of claim 1, further comprising an optical transmission element for transmitting the light beams from the light consolidating module to the waveband converting module, and from the waveband converting module to the light consolidating module.

8. The illumination system of claim 2, further comprising an optical transmission element for transmitting the light beams from the light consolidating module to the waveband converting module, and from the waveband converting module to the light consolidating module.

9. The illumination system of claim 1, wherein the first light source is disposed at a first side of the first light splitting element, the light consolidating module is disposed at a second side of the first light splitting element, and the first side is opposite to the second side.

10. The illumination system of claim 2, wherein the second light source is disposed at a first side of the second light splitting element, the light consolidating module is disposed at a second side of the second light splitting element, and the first side is opposite to the second side.

11. The illumination system of claim 2, wherein the light source module further comprises a third light source for providing a third light beam of a fourth waveband, the light splitting module further comprises a third light splitting element for reflecting a light beam of the fourth waveband;
   wherein, the third light splitting element is disposed between the waveband converting module and the light consolidating module.

12. The illumination system of claim 11, wherein the third light beam enters the light consolidating module through a second light input surface of the light consolidating module, the third light beam is transmitted from the light consolidating module to the third light splitting element, the third light splitting element reflects the third light beam, and the third light beam is transmitted to the light consolidating module, and then outputted through the light output surface.

13. The illumination system of claim 11, wherein the first light beam of the third waveband or the second light beam of the third waveband is a yellow light beam or a yellow-green light beam, and the third light beam of the fourth waveband is a red light beam.

14. The illumination system of claim 2, wherein the waveband converting module further comprises a second waveband converting zone;
   wherein, the light consolidating module transmits the second light beam having an incident angle smaller than the predetermined angel to the second waveband converting zone so as to form the second light beam of a fourth waveband, and the second light beam of the fourth waveband is transmitted from the waveband converting module to the light consolidating module, and then outputted through the light output surface.

15. The illumination system of claim 2, wherein the light splitting module further comprises:
   a fourth light splitting element allowing a light beam of the second waveband to pass through and reflecting a light beam of a fourth waveband, wherein the fourth light splitting element is disposed at a first side of the second light splitting element; and
   a fifth light splitting element allowing a light beam of the first waveband to pass through and reflecting a light beam of the third waveband, wherein the fifth light splitting element is disposed at a second side of the first light splitting element, and the fifth light splitting element and the first light splitting element form an included angle.

16. The illumination system of claim 15, wherein the first light splitting element and the fifth light splitting element are integrated as a single component, and the second light splitting element and the fourth light splitting element are integrated as a single component.

17. The illumination system of claim 16, wherein the fifth light splitting element and the fourth light splitting element form a first included angle, and the first included angle ($\theta_1$), the effective focal length (f) of an optical transmission element, and the distance (d) between the centers of the first waveband converting zone and the second waveband converting zone fit the equation of: $2\theta_1 = \tan^{-1}(d/f)$.

18. The illumination system of claim 16, wherein the first light source and the second light source form a second included angle, and the second included angle ($\theta_2$), the effective focal length (f) of an optical transmission element, and the distance (d) between the centers of the first waveband converting zone and the second waveband converting zone fit the equation of: $\theta_2 = \tan^{-1}(d/f)$.

19. The illumination system of claim 14, wherein the first light beam of the third waveband or the second light beam of the third waveband is a green light beam, and the first light beam of the fourth waveband or the second light beam of the fourth waveband is a red light beam.

20. A projection device, comprising:
   at least an illumination system as recited in claim 2, which provides a light beam composed of the first waveband light beam, the second waveband light beam and the third waveband light beam; and
   an imaging system using the light beam provided by the illumination system to form an image.

* * * * *